United States Patent [19]

Scott

[11] Patent Number: 4,526,198
[45] Date of Patent: Jul. 2, 1985

[54] IRRIGATION CONTROLLER

[75] Inventor: Loren W. Scott, Redlands, Calif.

[73] Assignee: The Toro Company, Minneapolis, Minn.

[21] Appl. No.: 543,952

[22] Filed: Oct. 20, 1983

[51] Int. Cl.³ .............................................. A01G 27/00
[52] U.S. Cl. ............................ 137/624.2; 137/624.18; 251/230; 239/70
[58] Field of Search ....................... 137/624.18, 624.2; 239/69, 70; 251/230

[56] References Cited

U.S. PATENT DOCUMENTS

| | | | |
|---|---|---|---|
| 3,063,643 | 11/1962 | Roberts | 239/70 |
| 3,440,434 | 4/1969 | Yates | 137/624.2 X |
| 3,708,068 | 2/1973 | Tischler | 137/624.2 X |
| 3,780,766 | 12/1973 | Link | 137/624.2 X |

Primary Examiner—Alan Cohan
Attorney, Agent, or Firm—Poms, Smith, Lande & Rose

[57] ABSTRACT

An irrigation controller for use with a plurality of electrically or hydraulically activated valves for automatically regulating time, location and duration of irrigation. An indexing rotary switch or rotary hydraulic pilot valve sequentially activates the valves. Adjustable timing units for each of the valves determines the dwell time of the rotary switch or valve on each valve. Hour and day timer wheels determine the days and time of day for the start of the rotary switch or valve. Each day and hour wheel contains two concentric circles of two or three position pins allowing selection from a multitude of combinations to achieve any possible watering desired. Interchangeable seven and six day wheels allow the controller to be utilized both for selection of given days of the week and alternate or every third day watering. A day wheel adjuster allows either the seven or six day wheel to be used with the hour wheel without any changes being required in the gearing between the wheels. An elastomeric band between the ratchet and pawl of the indexing means silences the controller for quite operation. A standard lawn sequence operates each time the indexing of the rotary switch or valve occurs. Less frequent shrub watering is possible in the electrical version by selection of a combination of the rotary switch, an override switch, and a special shrub switch. A drip station, independent of the rotary switch, operates directly with the conjunction of selected pins on the day and hour wheels.

27 Claims, 23 Drawing Figures

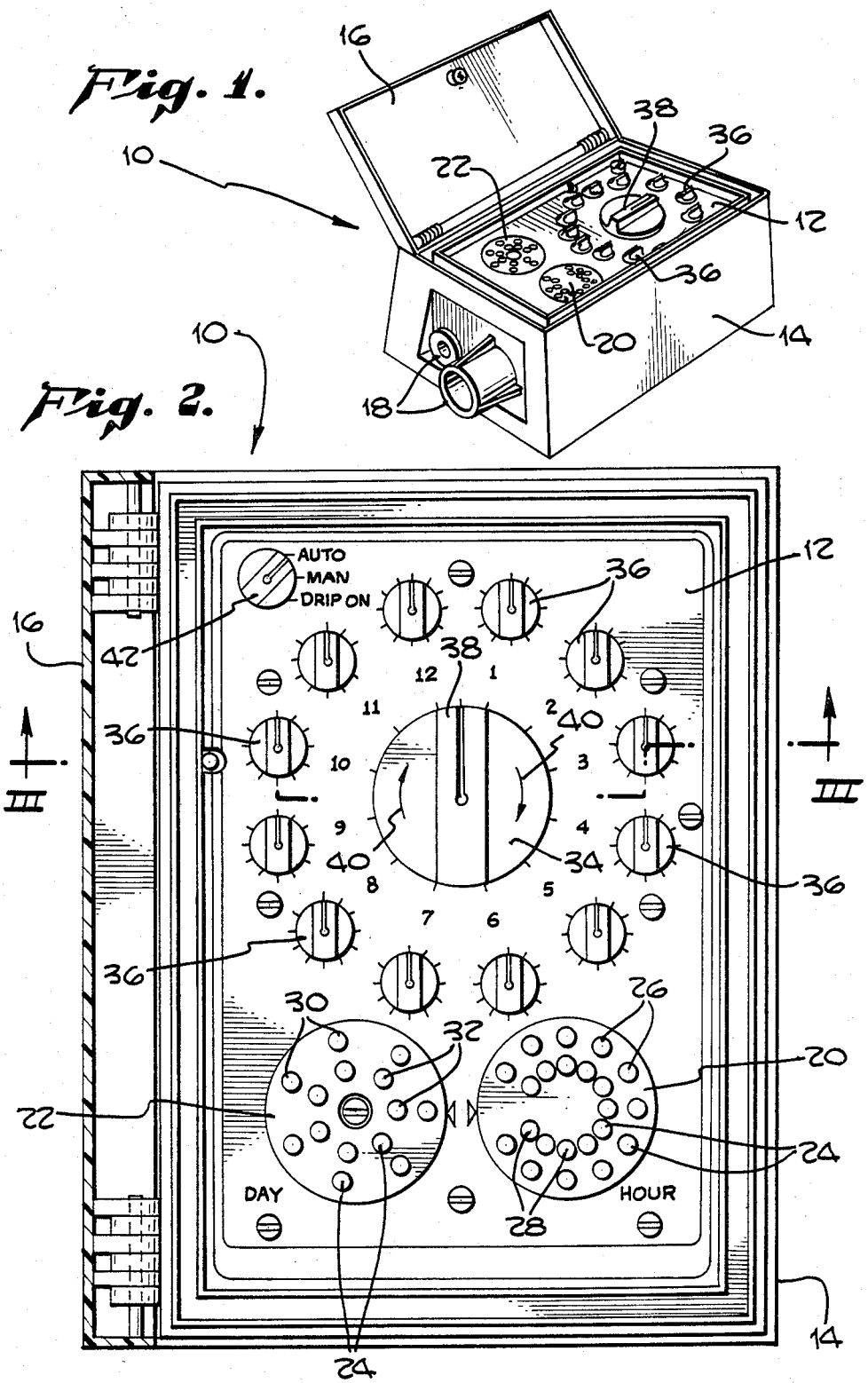

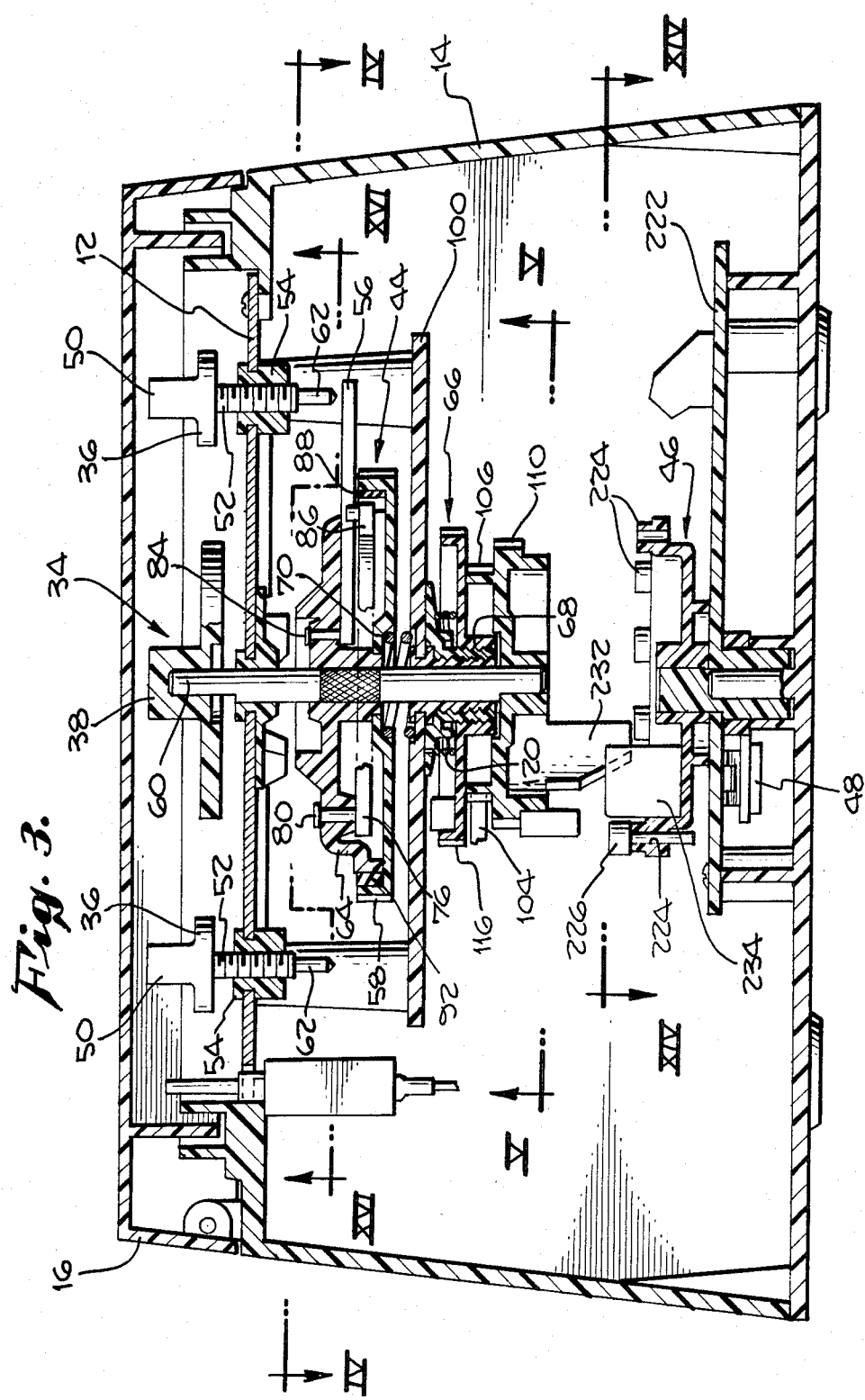

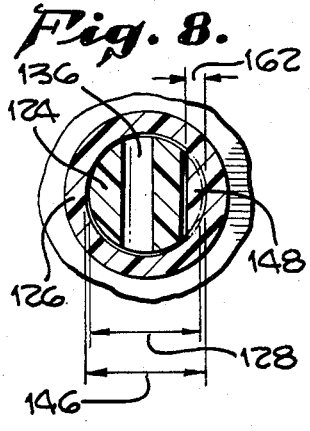
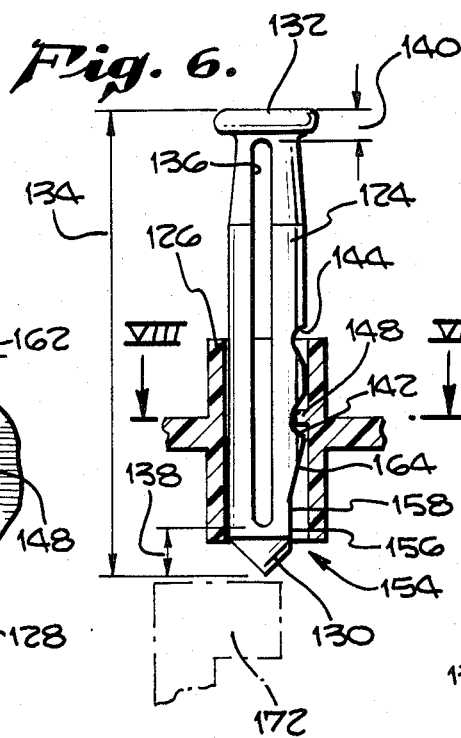
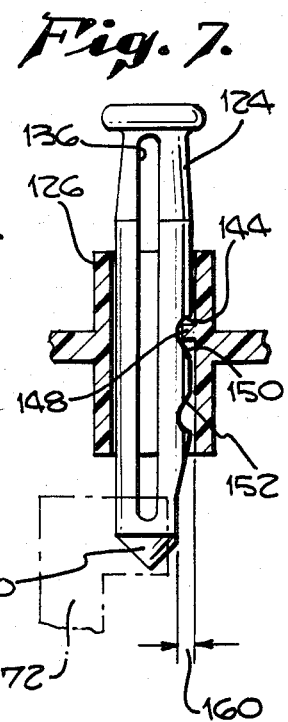
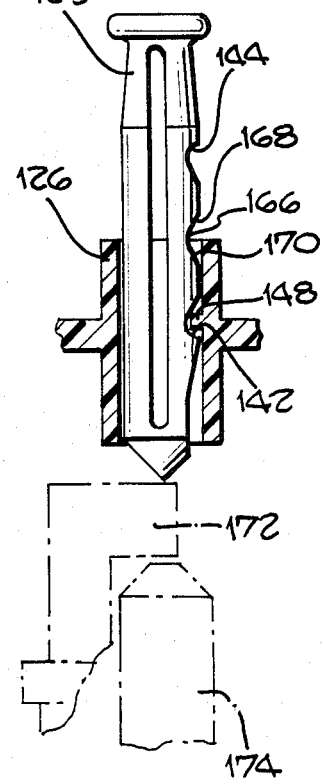
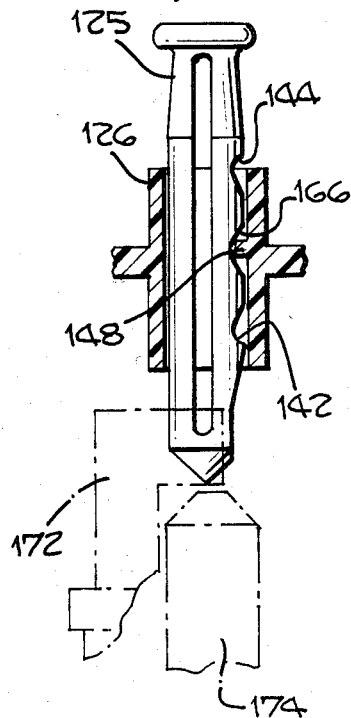
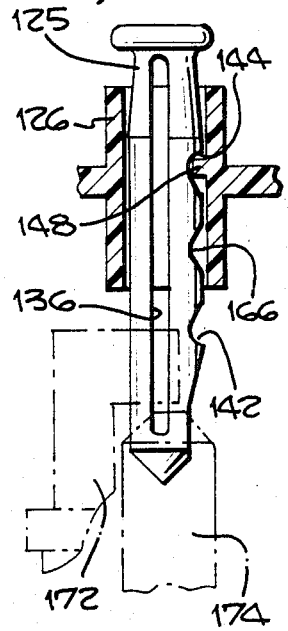

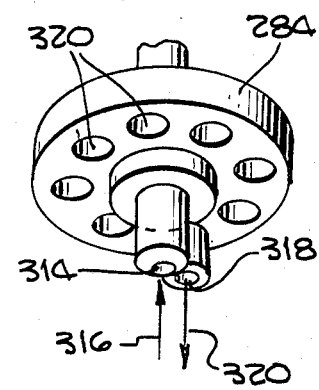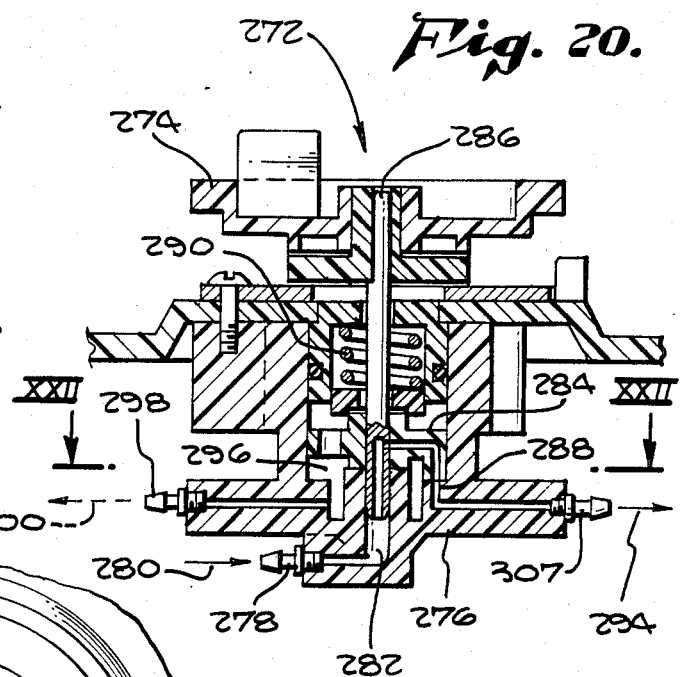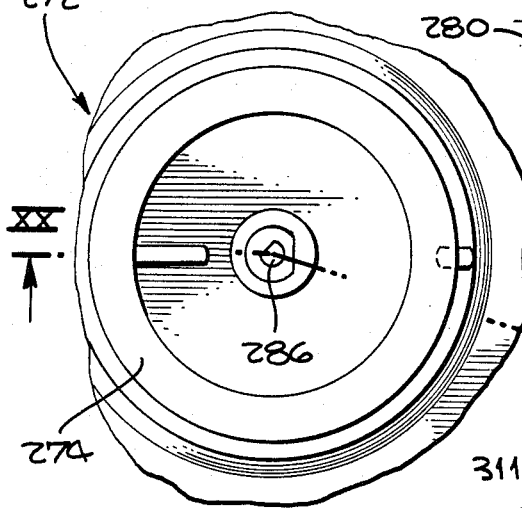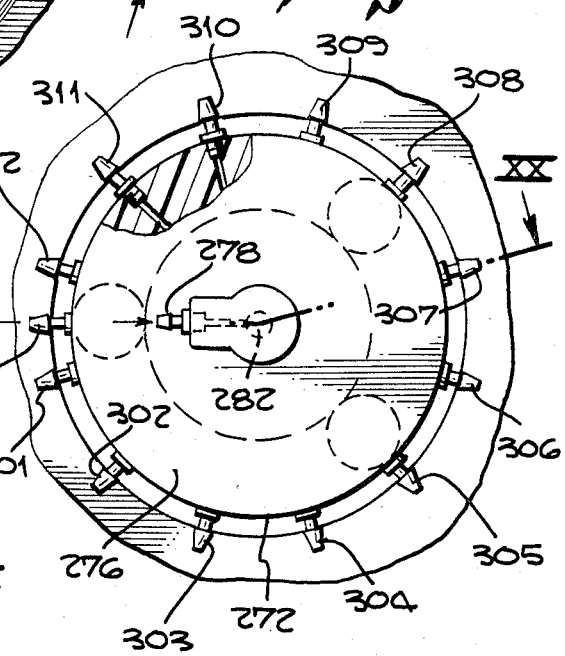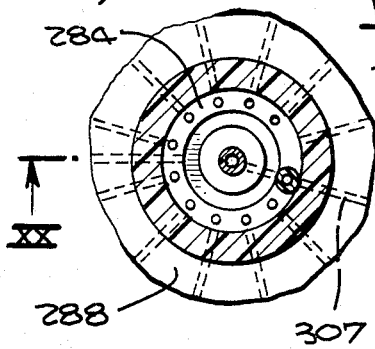

IRRIGATION CONTROLLER

BACKGROUND OF THE INVENTION

1. Field of the Invention

This invention relates to watering controllers and more particularly to a controller for use with a plurality of electrically or hydraulically activated valves for automatically regulating the time, location, and duration of lawn, shrub, and drip watering.

2. Description of the Prior Art

Sequential indexing controls for activating multiple station control apparatus are well-known in the art, including U.S. Pat. Nos. 3,040,227; 3,040,228; 3,227,821; 3,224,912; 3,291,922; 3,305,649; and 3,878,345. U.S. Pat. No. 3,040,227 to Hauser discloses a timing device provided with a plurality of stationary timing units disposed in a generally circular orbital array, one for each station being operated. Means are provided for orbitally moving an indexing part or timing cam to register successively with the various orbitally disposed stationary timing units. Driving means propel the timing cam between the stations at selectable rates of speed. Each timing unit is provided with a projectable timing part and means associated therewith for adjusting the part to selectd positioned of projection into the path of the indexing part or timing cam, as it is periodically brought into registry with each unit. A timing period duration is determined by the length of time required for the timing cam to contact and pass a projected timing part of an individual timing unit. The further the timing part is projected into the path of the cam, the longer the interference therebetween and the corresponding timing period continues. Upon the timing cam contacting or interfering with the timing part, the driving means are made to operate to move the timing cam at a preselected relatively slow orbital advance past the timing units. The timing period is ended when the cam passes the timing unit, losing contact with the projected timing part. Then, the indexing or driving means is made to advance the timing cam at a more rapid rate to the next station. An indicator scale calibrated in units of time is normally provided on each timing unit to show the setting of the projectable timing part and indicate the duration of the timing period thereby established.

U.S. Pat. No. 3,040,228 to Hauser describes a device which allows greater accuracy in adjusting and determining the duration of a timing period for certain preselected ranges of a timing period or portion thereof.

U.S. Pat. No. 3,227,821 to Hauser discloses a device in which stationary printed electrical circuits and sliding electrical switch means are employed with an orbitally moving timing cam and a plurality of individually adjustable timing units.

U.S. Pat. No. 3,244,912 to Hauser is directed to an improvement in the construction of the aforementioned devices wherein the accuracy of the device is not advesely affected by rough handling. Circuit plate means of electrically nonconductive material are rotatably mounted below the timing units in spaced opposed relation to the timing units such that each of the wiper or contact arms of the timing units contacts the surface of tbe plate means. Electrically conductive circuit paths are disposed in the surface of the plate means and are contacted by the individual wiper or contact arms in a predetermined manner during rotation of the plate means below the timing units. Such circuit plate means is mounted on the main shaft of the timing device with motor means adapted to rotate the shaft and thereby the circuit plate means. Electrical circuit means are provided for selectively connecting the motor means, operating the shaft, with a source of electrical potential in response to registry of the electrically conductive paths in the rotating circuit plate means with the timing unit wiper or contact arms. The engagement of the electrical circuit paths on the circuit plate means with the individual timing unit contact arms therefore controls the rotation of the main shaft of the timing device which in turn controls the operation of an associated multiple station control device. In its operation, the timing device, through its main shaft, constantly operates the mechanism of the control device between selected rates of speed suitable for timing and indexing operations. The main shaft of the timing device and therefore the mechanism of the control device are inactive only when the timing device is at the "off" setting and not in operation.

U.S. Pat. No. 3,291,922 to Hauser provides an improvement in which the control device being operated is actuated between successive stations during indexing periods but is maintained stationary or in a dwell stage during timing periods so that stationary contacts between electrical contacts, fluid contacts, etc., employed in the control device are affected during an entire timing period.

U.S. Pat. No. 3,305,649 to Hauser discloses a timing disk and assembly having flat wafer-thin timing units to allow more timing units to be placed on a given disk than would be possible in prior arrangements.

U.S. Pat. No. 3,878,345 to Hauser discloses another variation on timing units in which the cam face is of such shape that the duration of deflection of the lever by the cam face of a timing unit is variable depending upon the location of the cam face toward or away from the center of the timing device.

All of the above patents concern sequential indexing devices for controlling multiple station systems. Once these devices are started, they run through the entire sequence of stations. Separate clocks have been utilized to automatically start the indexing controls at desired times. An example of such a day and hour controller is U.S. Pat. No. 3,864,539 to Hauser. A day timer disk is located inside a drum-type hour timer which is driven by an electric motor. The day timer disk is advanced once a day by an indexing pin. Switch actuators are located at the hour positions on the hour wheel and the day positions on the day wheel. A controlled device such as the indexing devices disclosed in the preceding series of patents is activated only when a switch actuator at one location of the hour timer activates an hour switch and a switch actuator at one location of the day timer simultaneously activates a day switch to provide an electric circuit to the controlled device. A holding means is provided to prevent disorientation of the day timer disk between respective days except during indexing.

Integration of electrical circuitry of the day and hour timers with the indexing switches has generally been ignored in irrigation controllers. Functional limitations have, therefore, been inherent in prior product designs. Usually only one kind of function could be selected on any given day.

The day and hour timer designs were based on clock configurations. Therefore, automatic watering operations where alternate day or every third day sequences were required by governmental authorities for the purpose of saving water became impossible. At best, the chosen alternate day or third day sequence was selected on the day timer wheel and then the day timer wheel had to be manually reset every week.

SUMMARY OF THE INVENTION

Accordingly, it is an object of the present invention to provide an improved irrigation controller for use with a plurality of electrically or hydraulically activated valves.

It is another object of the present invention to provide maximum flexibility of irrigation times, locations and durations over any hour and day sequence.

It is another object of the present invention to provide an integrated indexing switching means and day and hour timer controls to optimize the functional alternatives of the irrigation controller.

It is another object of the present invention to provide an irrigation controller having interchangeable seven and six day wheels.

It is another object of the present invention to provide an irrigation controller having timing wheels with a multiplicity of pin positions to control lawn, shrub, and drip watering independently of each other.

It is yet another object of the present invention to provide a shrub watering override means in the indexing switch which requires the specific selection of shrub watering on the day timing wheel before the less frequently watered shrubs will be watered by the irrigation controller.

It yet another object of the present invention to provide a drip watering switch activated by the conjunction of selected pins on the day and hour timing wheels which is totally independent of the rotary indexing switch.

It is another object of the present invention to provide a drip watering cycle which operates over multiples of hours as opposed to multiples of minutes.

It is another object of the present invention to provide an irrigation controller which operates with a minimum of noise.

The above, and other objects of the present invention are achieved according to the preferred embodiment thereof, by providing a rotary switch means for sequentially activating the remote plurality of electrically or hydraulically activated valves. An indexing means moves the rotary switch means progressively with dwell times on any given valve being determined by adjustable timing unit means. An hour timer means determines the day for activating the indexing means. A day timer means determines the day or days for activating the indexing means. The conjunction of the hour and day timer means selections initiates the rotation of the indexing means.

Multiple selection possibilities on both the day and hour timer wheels are provided by two concentric rows of pins on each wheel having pins which are adjustable in two or three positions. If lawn watering is desired which generally occurs every day, the particular pins for the time and days are placed into the lawn watering position. If shrub watering is desired which does not require daily watering, the shrub watering pins and positions of the pins are selected. If drip watering is required which extends over a long period of time at low volumes, the drip watering pins and positions are selected.

The ability of the present invention to allow these multi-varied selections is based upon the improved structure of the cylindrical selector pin and receptacle. Each pin is designed to be inserted in its receptacle in the day or hour wheel with a minimum of effort and to remain in the receptacle indefinitely through multiple pin location changes and controller operations. The general shape of both the pin and receptacle are cylindrical with the receptacle surrounding and providing support to the pin over 50% of the pin length at all times in all locations. Two or three pin detents depending upon the number of functions desired to be operated by the pin are located along the side of the pin to operate with a pin detent stop located on the side of the receptacle. The pin detents are basically cylindrical cuts in the side of the pin perpendicular to the axis of the pin. Additional sloping surfaces out of the detent cylindrical cuts are provided on the sides of the detents facing other detents on the pin. The side of the pin between the detents may also be flattened slightly to decrease resistance to movement between the detents. The pin detent stop on the cylindrical receptacle is preferably a rectangular solid located approximately halfway along the length of the receptacle. As a pin is moved from one detent to another, the pin detent stop moves up a sloping surface causing the compression of the pin sides into a slot along the axis of the pin. When the detent stop reaches the new detent, the pin sides spring back into the original position. The design of the pin detent stop and the detents makes removal of the pin from the receptacle very difficult while at the same time allowing movement of the pin from one detent to the other detent relatively easy.

Vertical placement of the pins and the receptacles on the day and hour wheels allows easy access and manipulation by an operator. The vertical configuration also facilitates the location of numerous pins and receptacles on each day and hour wheel face for a maximization of possible selections.

Another improvement of the present invention is the provision for the interchangeability of six and seven day timer wheels. The seven day timer wheel is standard for normal clocks and is generally provided with all irrigation controllers. However, water rationing, which occurs frequently in various parts of the country, has caused ordinances to be passed which allow watering to occur only on alternate or every third days. The six day wheel can then be inserted to provide alternate day or every third day irrigation by the selection of the appropriate pins. The problem inherent in the substitution of a timer wheel having six divisions as opposed to a wheel having seven divisions is that the gearing of the day timer wheels, the hour timer wheel, and the idler connector remains the same. Therefore, while the gearing for seven day wheels can be selected to precisely locate the seven day wheel at a desired position for any given day for activation of ancillary switches, the same gearing will always be slightly off when used by a six day wheel. The present invention solves the gearing problem by the provision of a day wheel holder means for adjusting and holding either the six or seven day timer wheel at the desired location exclusive of the gearing between the hour and day wheels. The holder means comprises a plurality of semicircular ridges facing the periphery of the day wheel having one semicircular ridge for each given day. A positioner lever having an adjuster means is biased against the semicircular ridges by a spring. The adjuster means is a V-shaped centering notch which has a width at the open end of the V wide enough to provide for any given location of either the six or seven day wheel after being released by the hour wheel. The semicircular surface on the day timer wheel will then slide down into the V of the adjuster means causing the six day wheel to advance slightly from its release position and returning the seven day wheel slightly from its release position depending upon the selection of gearing between the hour and day wheels.

An additional improvement of the present invention comprises a silencer in the indexing means. The indexing means in the present invention includes an indexing motor driving a ring gear on the periphery of a clutch which is normally engaged. When a clutch lever touches a timing unit for a particular watering valve, the clutch lever disengages a pawl on the inside of the clutch at the inside of the ring gear thereby allowing the ring gear to rotate freely in relation to the remainder of the clutch. In previous devices, the pawl would rattle against the ratchet teeth on the clutch when the clutch was disengaged. The present invention includes an elastomeric band covering all of the teeth of the ratchet to make physical contact between the pawl and the ratchet teeth impossible. Instead, the pawl bumps along the elastomer in silence. The elastomeric band is held in position between the ratchet wheel and the pawl by a carrier. The ratchet wheel teeth of the present invention are semicircular indentations in the inner surface of the ring gear. Semicircular protrusions on the elastomeric band fit into the indentations on the ring gear and serve to hold the band in a single position as the ring gear rotates. The semicircular teeth improve the angle of contact between the pawl and the teeth both for teeth that do not have the semicircular protrusions of the band and those that do have the few semicircular protrusions.

BRIEF DESCRIPTION OF THE DRAWING

The above and other embodiments of the present invention may be more fully understood from the following detailed description taken together with the accompanying drawing wherein similar reference characters refer to similar elements throughout and in which:

FIG. 1 is a perspective view of an irrigation controller;

FIG. 2 is a front view of the upper portion of the embodiment shown in FIG. 1;

FIG. 3 is a sectional view along line III—III in FIG. 2;

FIG. 6 is a partial sectional view along line VI—VI of FIG. 12;

FIG. 7 is a sectional view similar to FIG. 6 showing the pin at a different location;

FIG. 8 is a sectional view along line VIII—VIII of FIG. 6;

FIG. 9 is a partial sectional view along line IX—IX of FIG. 12;

FIG. 10 is a partial sectional view similar to FIG. 9 showing the pin in a middle location;

FIG. 11 is a partial sectional view similar to FIG. 9 of the pin in the lowest position;

FIG. 19 is a top view of a hydraulic embodiment of the present invention replacing the rotary electrical switch of FIG. 14;

FIG. 20 is a sectional view along lines XX—XX of FIG. 19;

FIG. 21 is a bottom view of the embodiment shown in FIG. 20;

FIG. 22 is a sectional view along lines XXII—XXII of FIG. 20; and

FIG. 23 is a perspective view of the rotary valve of FIG. 20.

DESCRIPTION OF THE PREFERRED EMBODIMENT

Figure 4:
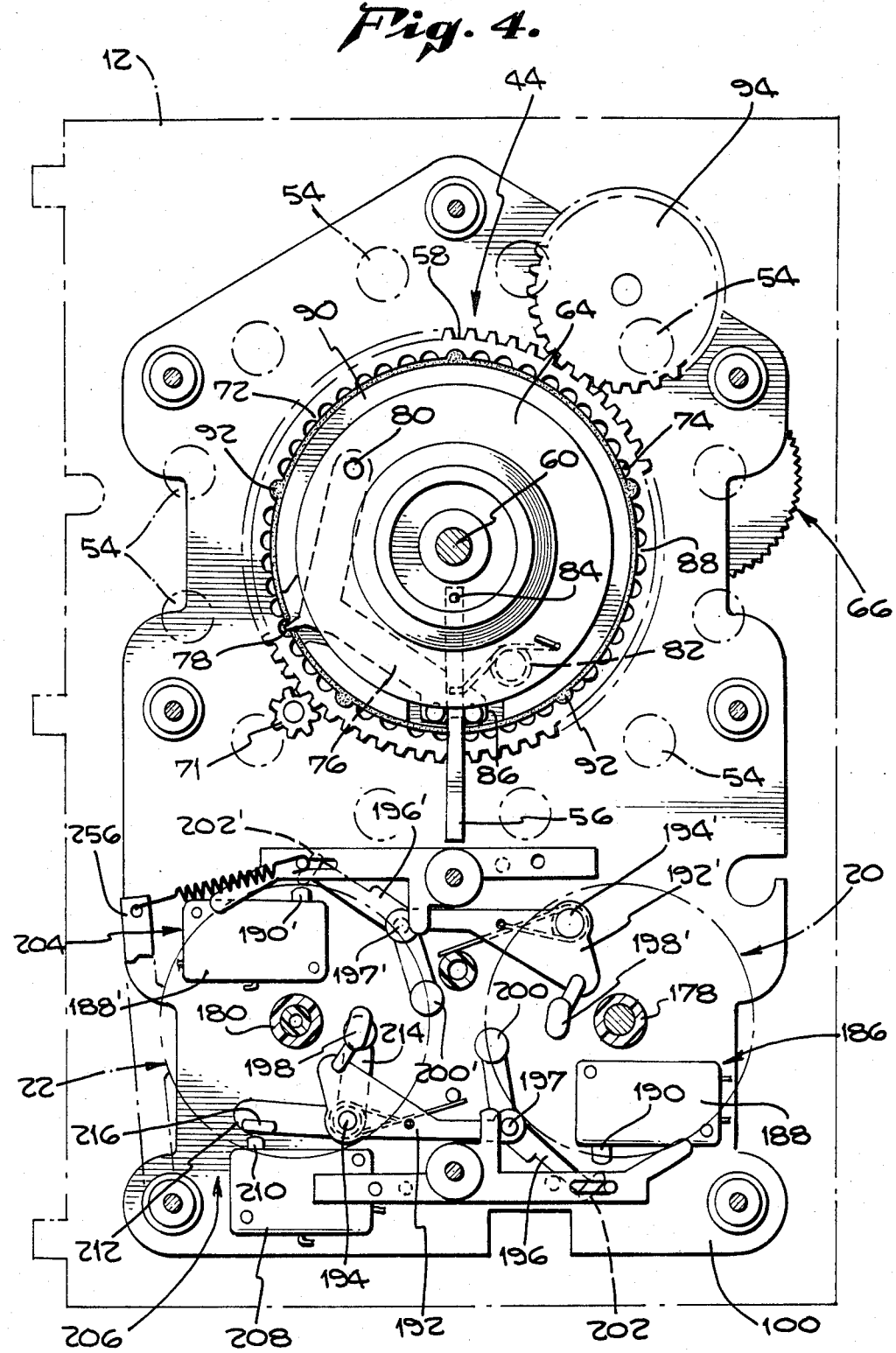
FIG. 4 is a sectional along line IV—IV of FIG. 3.

Referring now to the drawing, there is illustrated in FIG. 1 thereof a perspective view of an irrigation controller, generally designated 10. Irrigation controller 10 includes a control panel 12, cabinet 14, door 16, and electrical conduit inlets 18.

FIG. 2 is a front view of control panel 12 and cabinet 14 with a sectional view of door 16 in the open position. Control panel 12 has an hour timer means wheel 20 for determining the time of day for activating of the irrigation controller 10. Day timer means wheel 22 determines the day for the activation of irrigation controller 10. A plurality of pins 24 are located in two concentric circles on both hour wheel 20 and day wheel 22 generally designated lawn and shrub pins 26 on the outer concentric circle of pins on hour wheel 20, drip watering pins 28 on the inner concentric circle of pins on hour wheel 20, drip watering pins 30 on the outer concentric circle of day wheel 22, and lawn and shrub pins 32 on the inner concentric circle of day wheel 22. Thus, selection of lawn watering requires adjustment of pins 26 and 32 on both hour and day wheels 20 and 22 in order to achive lawn watering by irrigation controller 10. Shrub watering, which generally occurs less frequently than lawn watering, requires the adjustment of pins 26 and 32 to different positions in order to achieve shrub watering. Drip watering generally occurs over the longest periods of time and is selected by making the desired adjustments to pins 28 and 30 on hour and day wheels 20 and 22. Any and all of these different types of watering may be selected simultaneously or varied throughout the day and weak utilizing pins 24.

Control panel 12 also has the controls for indexing means 34 including twelve adjustable timing units 36. Each timing unit 36 controls the dwell time of indexing means 34 on the activation of one of a plurality of remotely controlled electrically activated irrigation valves. Rotation of a particular timing unit 36 in a clockwise direction results in an increase in the dwell time of indexing means 34 on that particular valve. As knob 38 rotates in the direction of arrows 40, indexing means 34 moves through the sequence of twelve timing units 36 which in turn control twelve remote irrigation valves.

Mode selector switch 42 provides three selections for operation of irrigation controller 10: automatic operation utilizing hour wheel 20, day wheel 22, and indexing means 34; manual operation of the lawn and shrub watering valves by manual rotation of knob 38; and manual operation of the drip watering circuit only.

FIG. 3 is a sectional view along line III—III of FIG. 2 showing indexing means 34, adjustable timing units 36, clutch 44, shrub wheel 46, and rotary switch 48. As discussed above, each timing units 36 determines the dwell time of indexing means 34 on the activation of one of the remote valves. Timing unit 36 is adjustable by turning knob 50 to cause timing unit 36 to move up and down on its threads 52 in threaded fitting 54. As shown in FIG. 3, clutch lever 56 of clutch 44 misses timing unit 36. Clutch 44 is a normally engaged clutch wherein rotation of ring gear 58 causes rotation of shaft 60 which in turn rotates shrub wheel 46 and rotary switch 48 to sequentially activate the remotely located watering valves.

As shown, timing unit 36 on the right side of FIG. 3 is off allowing clutch lever 56 to sweep past and rotary switch 48 to only momentarily activate the remote valve. If timing unit 36 is screwed down into the path of clutch lever 56, clutch lever 56 will hit tip 62 which will stop the rotation of the driven side 64 of clutch 44 which is coupled to shaft 60. Ring gear 58 rotates freely on shaft 60 and will continue to rotate after clutch lever 56 engages tip 62 of adjustable timing unit 36. As ring gear 58 continues to rotate, clutch re-engagement means 66 turns on threaded bushing 68 to pull shaft 60 and clutch 44 down on spring 70 until clutch lever 56 clears tip 62 of timing unit 36 causing clutch 44 to re-engage and again rotate shaft 60. Clutch re-engagement means 66 is geared to rotate slowly in comparison to ring gear 58 in order to allow rotary switch 48 dwell time on a given remote valve switch to allow the desired irrigation to occur. Adjustment of timing unit 36 up and down in threaded fitting 54 increases the dwell time of rotary switch 48 on a given remote valve switch as timing unit 36 is turned down and decreases the dwell time, eventually to zero, as timing unit 36 is turned up.

FIG. 4 is a sectional view along IV—IV of FIG. 3. Ring gear 58 is driven by a pinion 71. A ratchet wheel 72 is formed on the inner surface of ring gear 58 having ratchet teeth 74. Each of the rachet teeth 74 is formed as a semicircular indentation. Pawl 76 attached to clutch lever 56 engages ratchet teeth 74 at pawl tip 76. Pawl 76 rotates about pawl axle 80 with pawl tip 78 being urged against ratchet teeth 74 by pawl spring 82 pressing against clutch lever 56. Clutch lever 56 rotates about clutch lever axle 84 and is held in position by lever holder 86 and the pressure against lever holder 86 created by pawl spring 82.

When clutch lever 56 rotates freely without touching a timing unit 36 as described in FIG. 3, pawl tip 78 is normally engaged in ratchet teeth 74. Thus, as ring gear 58 rotates in a clockwise direction, pawl 76, clutch lever 56, and shaft 60 all rotate together in a clockwise direction. When clutch lever 56 engages a timing unit 36 as described in FIG. 3, clutch lever 56 is stopped from rotating causing pressure against pawl spring 82 and the retraction of pawl tip 78 from ratchet teeth 74. Ring gear 58 the continues to rotate in a clockwise manner while the driven side 64 of clutch 44 remains stationary.

When clutch re-engagement means 66 causes clutch lever 56 to pass under timing unit 36 after initially engaging timing unit 36 as described in FIG. 3, clutch lever 56 is immediately urged in a clockwise direction by pawl spring 82 which in turn forces pawl 76 and pawl tip 78 into re-engagement with ratchet teeth 74. The driven side 64 of clutch 44 then becomes re-engaged with ring gear 58 causing rotation of shaft 60.

A silencer 88 in the form of an elastomeric band (the stippled circular band in FIG. 4) is positioned between pawl 76 and ratchet teeth 74 in order to eliminate the creation of noise when clutch 44 is disengaged. Without silencer 88, pawl tip 78 would chatter across ratchet teeth 74. The elastomeric band of silencer 88 is held in position by a band carrier 90 which continuously positions the elastomeric band between the pawl 76 and the ratchet teeth 74. Silencer 88 is held in a fixed relationship to ring gear 58 by a plurality of semicircular knobs or protrusions 92.

The semicircular shape of ratchet teeth 74 enhances the engagement of pawl tip 78 against ratchet teeth 74 when elastomeric band silencer 88 is in position between pawl 76 and ratchet teeth 74. The semicircular configuration of ratchet teeth 74 also allows engagement of pawl tip 78 against ratchet teeth 74 where protrusions 92 of elastomeric band silencer 88 partially fill ratchet teeth 74.

Figure 5:
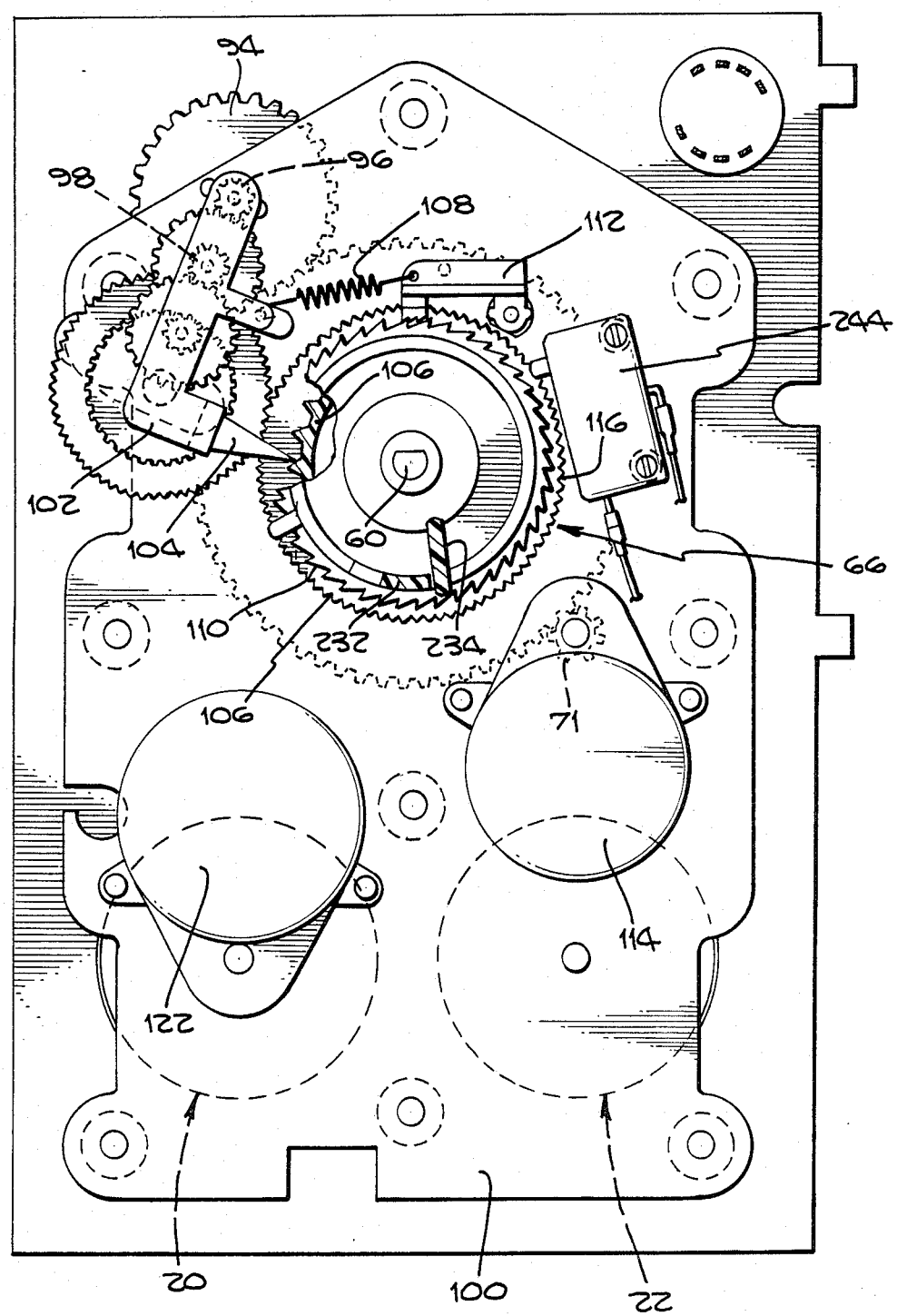
FIG. 5 is a sectional view generally of the indexing means and motors along line V—V of FIG. 3.

Clutch re-engagement means 66 receives power from ring gear 58 through input gear 94 which is more fully illustrated in FIG. 5. FIG. 5 is a sectional view along line V—V of FIG. 3. Input pinion 96 connects input gear 94 to gear train 98 of clutch re-engagement means 66. FIG. 5 is a bottom view on the other side of rear plate 100 from the view shown in FIG. 4.

Gear train 98 is rotated continuously by ring gear 58 shown in FIG. 4. Gear train 98 is held in position by gear train holder 102 and utilizes input pinion 96 as an axle. Gear train holder 102 has a holder knob 104 that is urged against lugged wheel 106 by spring 108. Lugged wheel 106 is coupled to shaft 60 and second ratchet wheel 110 on the driven side 64 of clutch 44 (FIG. 4). A side view of lugged wheel 106 and second ratchet wheel 110 is shown in FIG. 3. When clutch 44 rotates without clutch lever 56 engaging a timing unit 36 as discussed above at FIG. 3, holder knob 104 bumps along lugged wheel 106 disengaging gear train 98 each time a new lug on lugged wheel 106 is encountered. Second pawl 112 acting against second ratchet wheel 110 always ensures that clutch 44 only rotates in one direction (counter-clockwise as shown in FIG. 5).

When clutch lever 56 (FIG. 3) engages a timing unit 36 (FIG. 3), shaft 60 stops turning including lugged wheel 106. Gear train 98, however, does not stop turning as it is powered directly by index motor 114 operating through pinion 71, ring gear 58, and input gear 94. Gear train 98 turns helix gear 116 which rides on threaded bushing 68 (FIG. 3). As helix gear 116 continues to turn, it screws down, as described in connection with FIG. 3, on threaded bushing 68 (FIG. 3) drawing down shaft 60 through threaded bushing 68 until clutch lever 56 (FIG. 3) clears tip 62 (FIG. 3) of timing unit 36. Immediately upon the release of clutch lever 56, shaft 60 begins to rotate causing lugged wheel 106 to rotate. Holder knob 104 immediately encounters a lug on lugged wheel 106 which pushes away holder knob 104 and gear train 98 to release helix gear 116 which is immediately returned to a starting position by helix gear spring 120 (FIG. 3).

FIG. 5 also shows timer motor 122 which turns hour wheel 20 shown in FIG. 2. As discussed above in conjunction with FIG. 2, selection of various desired watering sequences is achieved by manipulation of pins 24 on hour wheel 20 and day wheel 22.

FIGS. 6 through 11 show views of pins 24 in different adjustment locations. Two position pin 124 is illustrated in FIGS. 6 and 7. Three position pin 125 is illustrated in FIGS. 9, 10 and 11. Two position pin 124 may be utilized to select between two different functions or between on and off. Three position pin 125 may be utilized to select between three different functions or between on and off for one function and on and off for two functions simultaneously.

FIG. 8 is a sectional view of FIG. 6 along line VIII—VIII. Pin 124 is cylindrical. Pin 124 has a cylindrical receptacle 126 surrounding at least half of pin 124 at any position. As shown in FIGS. 6 and 8, selector pin 124 has a first predetermined diameter 128, an insertion end 130, an adjustment end 132, a first predetermined length 134 from insertion end 130 to adjustment end 132, first walls defining a slot 136 through the axis of pin 124 beginning a second predetermined length 138 from insertion end 130 and ending a third predetermined length 140 from adjustment end 132, a first pin detent 142 and a second pin detent 144.

Cylindrical receptacle 126 has a second predetermined diameter 146 greater than first predetermined diameter 128 of pin 124. A pin detent stop 148 in the form of a rectangular solid on the inner surface of cylindrical receptacle 126 combines with first pin detent 142 or second pin detent 144 to hold pin 124 in the desired position.

First pin detent 142 and second pin detent 144 are cylindrical cuts on the surface of pin 124 perpendicular to the axis of pin 124, parallel to the plane of slot 136 and parallel to each other with sloped sides 150 and 152 (FIG. 7) on the sides of the detents in the direction of the other detents. Thus, pin detent stop 148 easily rides up sloped sides 150 or 152 as slot 136 partially collapses to allow movement of pin 124 to the other of the detent stops. Attempted movement of pin 124 either up or down past the detents causes the 90 degree faces of pin detent stop 148 to encounter the curvature of the cylindrical cuts which makes further movement difficult. The side of the pin between the detents may also be flattened slightly to decrease resistance to movement between the detents (not illustrated).

In order to facilitate the original insertion of pin 124 in receptacle 126, insertion end 130 has an insertion facilitator means 154 comprising a lip 156 on insertion end 130 having a lip plane 158 parallel to slot 136 on the same side of the axis of pin 124 as pin detents 142 and 144 and having a first depth 160 (FIG. 7) from the cylindrical surface of pin 124 greater than second depth 162 (FIG. 8) of the protrusion of rectangular solid pin detent stop 148 into cylindrical receptacle 126. A slope plane 164 from lip plane 158 to the cylindrical surface of pin 124 at the edge of first pin detent 142 completes insertion facilitator means 154. Thus, when pin 124 is initially inserted into receptacle 126, lip plane 158 requires that pin 124 be rotated in receptacle 126 until lip plane 158 matches and is parallel to pin detent stop 148. As pressure is put onto adjustment end 132 to force pin 124 further into receptacle 126, pin detent stop 148 rides up on slope plane 164 causing slot 136 to partially collapse. When pin 124 is sufficiently pushed into receptacle 126 to allow pin detent stop 148 to enter first pin detent 142, the sides of pin 124 spring back to cause pin 124 to regain its cylindrical configuration and achieve the general shape and position as shown in FIG. 6.

FIG. 7 is the same pin in FIG. 6 after it has been pushed down into receptacle 126 until pin detent stop 148 is located in second pin detent 144.

FIGS. 9, 10 and 11 illustrate three position pin 125 acting in a receptacle 126. Three position pin 125 is generally identical to two position pin 124 of FIGS. 10 and 11 except for the addition of a middle pin detent 166 and rearrangement of second pin detent 144 to a higher location on pin 125. Middle pin detent 166 has two sloped sides 168 and 170 because movement of pin 125 either up or down in the direction of first pin detent 142 or second pin detent 144 may be desired. FIG. 10 shows three position pin 125 with pin detent stop 148 located in middle pin detent 166. FIG. 11 shows pin detent stop 148 located in second pin detent 144.

Operation of two position pin 124 and three position pin 125 with upper lever 172 and lower lever 174 are illustrated by the shadow outlines of upper lever 172 and lower lever 174 in FIGS. 6, 7, 9, 10 and 11. In FIG. 6, two position pin 124 is shown with pin detent stop 148 in first pin detent 142. In this position, two position pin 124 does not engage upper lever 172. FIG. 7 shows the same two position pin 124 with pin detent stop 148 in second pin detent stop 144. In the lower position, two position pin 124 engages upper lever 172 to control whatever operation is connected to upper lever 172. Similarly in FIG. 9, three position pin 125 is shown in the highest position with pin detent stop 148 in first pin detent 142. In this highest position, three position pin 125 misses both upper lever 172 and lower lever 174. FIG. 10 illustrates three position pin 125 in a middle position with pin detent stop 148 located in middle pin detent 166. In this middle position, three position pin 125 engages upper lever 172 to perform whatever function is connected to upper lever 172. At the same time, three position pin 125 misses lower lever 174 so that whatever function is controlled by lower lever 174 does not take place. FIG. 11 shows the same three position pin 125 located in the lowest position with pin detent stop 148 in second pin detent 144. In this lowest position, three position pin 125 engages both upper lever 172 and lower lever 174 to cause the operations controlled by both levers to be initiated.

Figure 12:
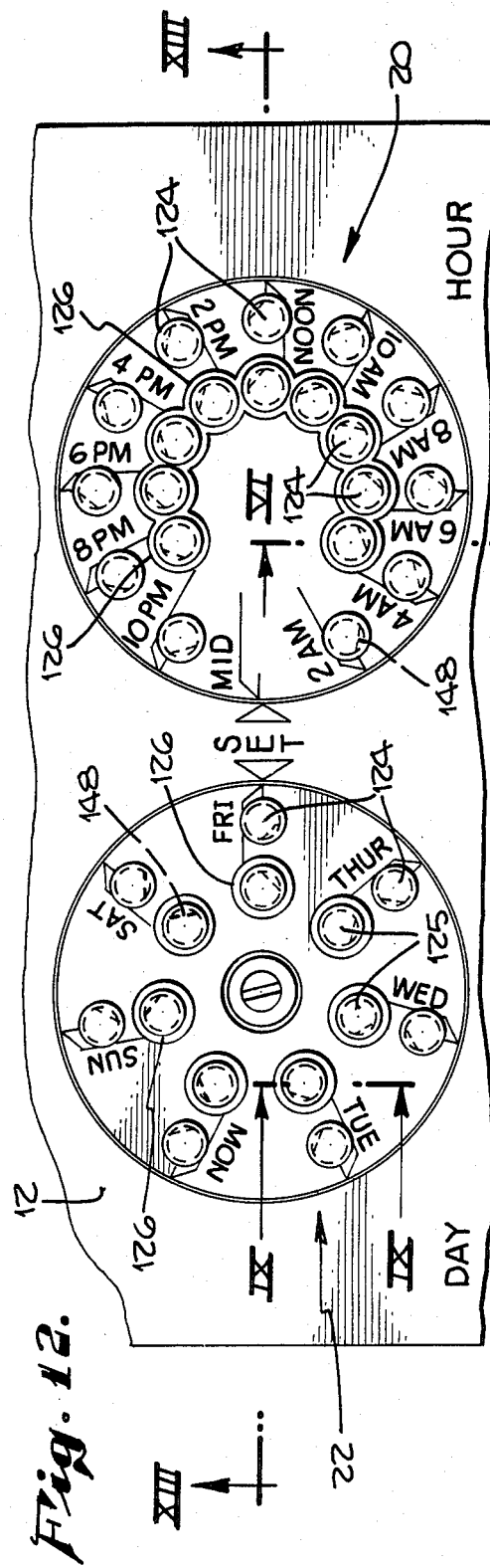
FIG. 12 is an enlarged view of the day and hour timer wheels located at the bottom of FIG. 2.

FIG. 12 is an enlarged view of the day and hour timer wheels located at the bottom of FIG. 2. Multiple two position pins 124 and three position pins 125 with their corresponding receptacles 126 are located in day wheel 22. Hour wheel 20 only has two position pins 124 located in receptacles 126. Pins 124, pins 125, and receptacles 126 have axes parallel to the axes of hour wheel 20 or day wheel 22.

Figure 13:
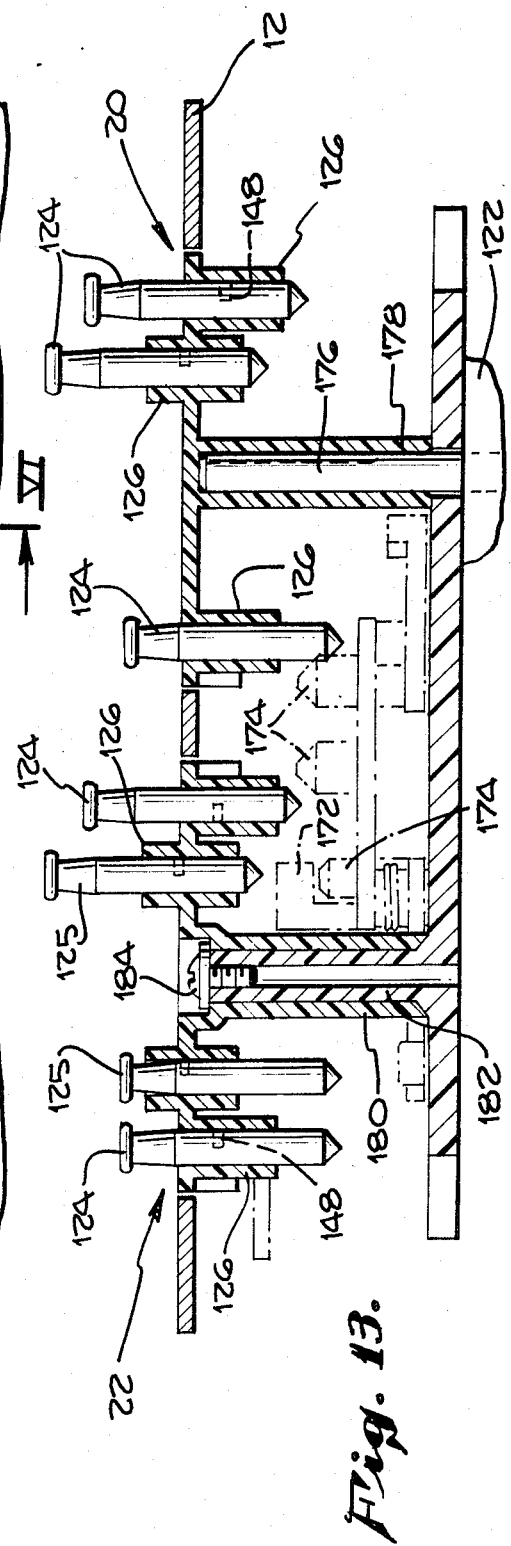
FIG. 13 is a sectional view along line XIII—XIII of FIG. 12.

FIG. 13 is a sectional view along line XIII—XIII of FIG. 12. Hour wheel 20 is connected to shaft 176 of timer motor 122 shown in FIG. 6 through hour wheel shaft 178. Day wheel 22 rotates about day wheel shaft 180 on day wheel post 182. A screw 184 retains day wheel 22 on day wheel post 182 and allows removal of day wheel 22 for substitution of a different day wheel having a different number of days such as a six day wheel instead of the more usual seven day wheel.

Two position pin 124 on the left side of day wheel 22 is in the lower position as more clearly illustrated in FIG. 7. It should be noted that the sectional view of FIG. 13 does not allow the views of the detents and the detent stops shown in FIGS. 6, 7, 9, 10 and 11 to be illustrated. Three position pin 125 located to the left of day wheel shaft 180 is in the lowest position as more clearly illustrated in FIG. 11. Three position pin 125 located to the right of day wheel shaft 80 is in the highest position as better illustrated in FIG. 9. Two position pin 124 located on the right side of day wheel 22 is in the upper position as better illustrated in FIG. 6. Two position pin 124 on the left side of hour wheel 20 is in the lower position as better illustrated in FIG. 7. Both two position pins 124 on the right side of hour wheel 20 are located in the upper position as illustrated in FIG. 6.

Shadow outlines of upper lever 172 and lower levers 174 are shown between day wheel shaft 180 and hour wheel shaft 178. As day wheel 22 rotates, the three position pin 125 located on the left side of day wheel shaft 180 will eventually come into engagement with upper lever 172 and lower lever 174 located immediately below upper lever 172. The two position pin 124 on the left side of hour wheel 20 is shown in engagement with the right lower lever 174. Operation of the various functions of irrigation controller 10 is determined by the relative positions of pins 124 and 125 in relation to levers such as levers 172 and 174.

FIG. 4 illustrates the actual location and operation of the levers in irrigation controller 10 previously referred to for illustration purposes as upper lever 172 and lower lever 174. In FIG. 4, hour wheel 20 and day wheel 22 have been removed in order to better show the underlying levers and are represented in FIG. 4 solely by the shadow outline circles at the bottom of the FIG. 4. Lawn switch means 186 comprises lawn switch 188, lawn switch button 190, lawn lever one 192 rotating about lawn lever one axle 194, and lawn lever two 196 rotating about lawn lever two axle 197 located on one arm of lawn lever one 192. In order for lawn switch 188 to be activated, pins on both hour wheel 20 and day wheel 22 must engage lawn switch means 186 simultaneously. Initially, a pin on day wheel 22 must engage first portion 198 of lawn lever one 192 and push first portion 198 to the left rotating lawn lever one 192 about lawn lever one axle 194 in a counterclockwise direction as illustrated in FIG. 4. Rotation of lawn lever one 192 in a counterclockwise direction forces lawn lever two 196 into a position in which it may be engaged by a pin on hour wheel 20. A properly positioned pin on hour wheel 20 engages second portion 200 of lawn lever two 196 forcing second portion 200 to the left and causing lawn lever two 196 to rotate in a counterclockwise direction to force third portion 202 onto lawn switch button 190 to activate lawn switch 188.

Similarly, drip switch means 204 has an identical switch and lever arrangement. Drip switch 188' has drip switch button 190' which activates drip switch 188'. In order for drip switch 188' to be activated, an appropriately positioned pin on hour wheel 20 engages first portion 198' forcing first portion 198' to the right in FIG. 4 causing drip lever one 192' to rotate in a means 204 is initially direction around drip lever one axle 194'. Rotation of drip lever one 192' in a counterclockwise direction forces drip lever two 196' into a position where a properly adjusted pin in hour wheel 22 engages second portion 200' and forces second portion 200' to the right thereby causing third portion 202' to push drip switch button 190' and activate drip switch 188'.

Shrub switch means 206, on the other hand, requires only the selection of one pin on the day wheel. Shrub switch 208 is activated by the depressing of shrub switch button 210. Shrub lever 212 presses shrub switch button 210 when appropriately placed pin on day wheel 22 forces fourth portion 214 to the left causing shrub lever 212 to rotate about lawn lever one axle 194 forcing fifth portion 216 onto shrub switch button 210.

Figure 14:
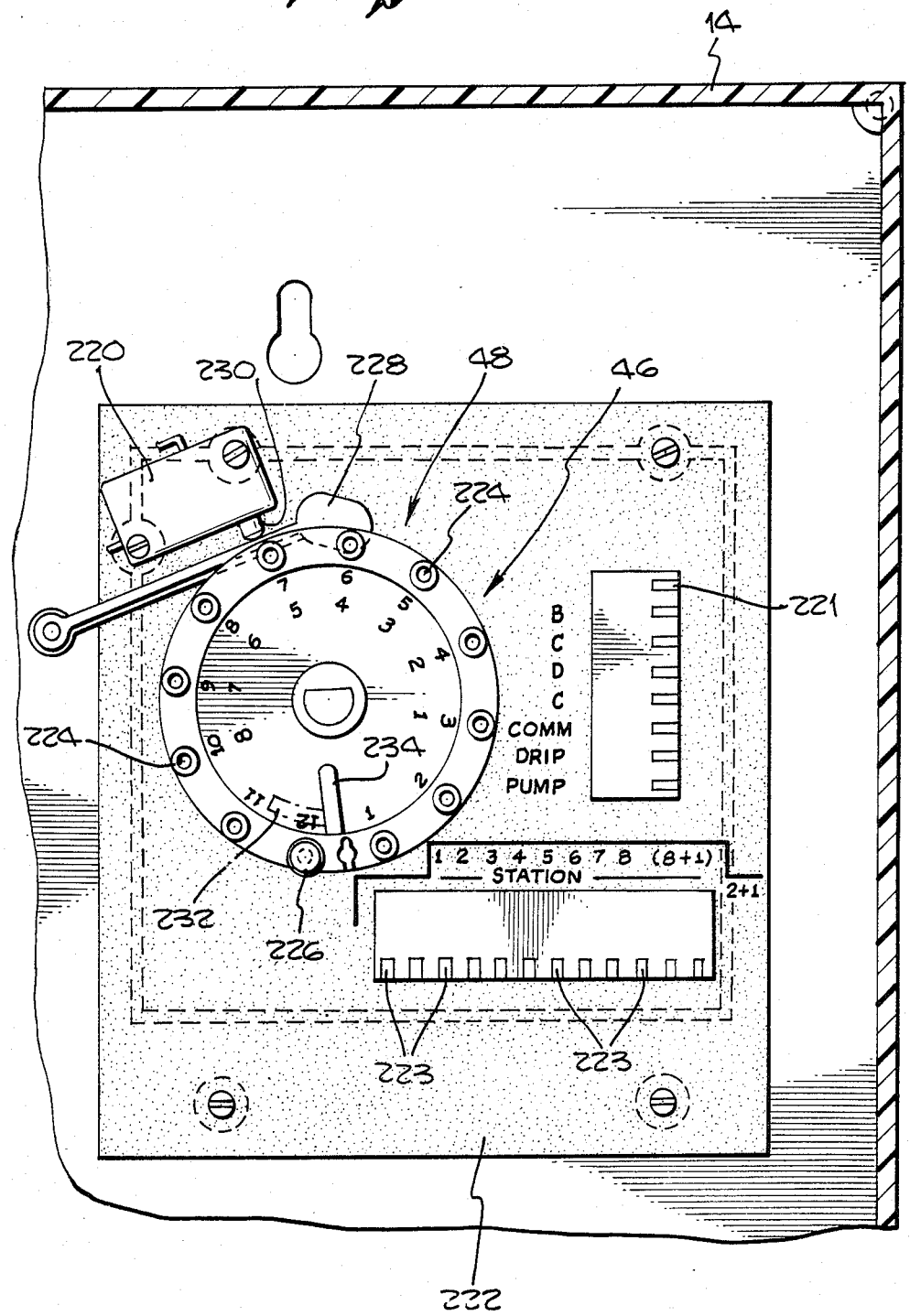
FIG. 14 is a partial sectional view along line XIV—XIV of FIG. 3.

FIG. 14 is a partial sectional view along line XIV—XIV of FIG. 3 showing shrub wheel 46, shrub override switch 220, and input connection 221 and output connections 223 for rotary switch 48 located underneath printed circuit board 222. Shrub override switch 220 is a normally closed switch and is described more fully in relation to FIG. 15. Shrub wheel 46 has a plurality of pin holders 224 numbered one through twelve, with one for each of the switching positions on rotary switch 48. Placement of a shrub override pin 226 in one of the pin holders 224 causes shrub wheel trip lever 228 to press against shrub override switch pin 230 thereby opening shrub override switch 220. The relationship of shrub wheel 46 to the remainder of irrigation controller 10 is illustrated in FIG. 3. In FIG. 3, a shrub override pin 226 is shown inserted in a pin holder 224 on the left side of shrub wheel 46. Shrub wheel 46 is turned by engagement of second ratchet wheel lever 232 with shrub wheel lever 234.

Figure 15:
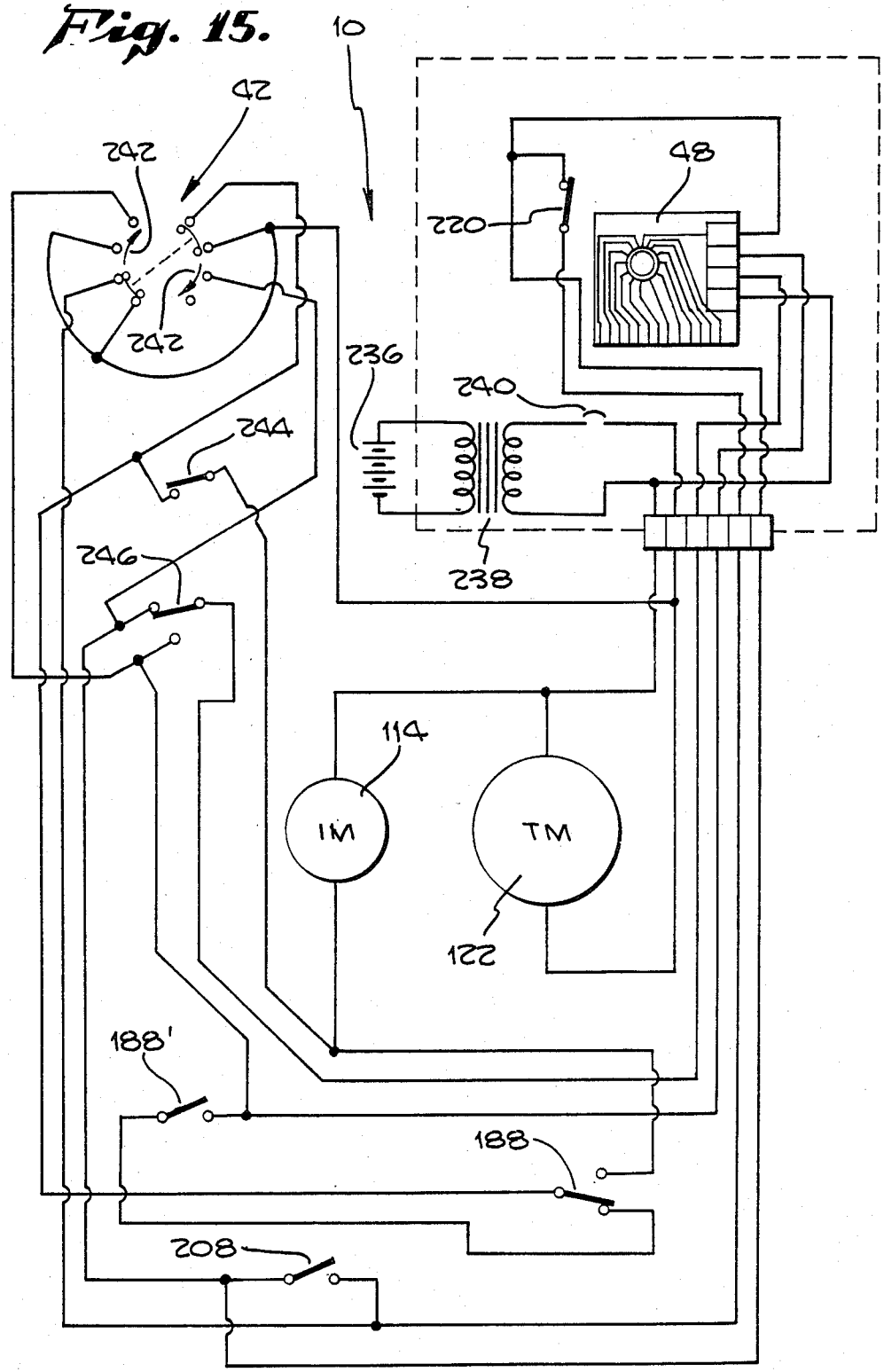
FIG. 15 is a wiring diagram of the electrical embodiment.

FIG. 15 is a wiring diagram of the electrical embodiment of irrigation controller 10. Irrigation controller 10 is connected to a line source of power 236 which is converted to a lower voltage by transformer 238. A circuit breaker 240 provides protection for the remainder of irrigation controller 10. Timer motor 122 is connected directly to the transformer 238 and operates continuously. The initiation of shrub and lawn watering sequences is determined by the selection of two pins on the hour and day wheels. The conjunction of the two previously selected pins operating through levers turns on lawn switch 188 to start indexing motor 114. Indexing motor 114 causes rotary switch 48 to rotate through the twelve switch positions.

The basic operation of irrigation controller 10 presupposes the positioning of mode selector switch 42 in the automatic mode where the timer motor 122 controls the operation. Mode selector switch 42 may be rotated clockwise twice in the direction of arrows 242. Full counterclockwise rotation as illustrated allows contact across adjacent poles in the upper right quadrant and a second connection across adjacent poles in the lower left quadrant to cause automatic operation of irrigation controller 10. Positioning of mode selector switch 42 to the middle position allows manual operation of irrigation controller 10 with contact being made across adjacent poles in the middle of mode selector switch on the right side and across adjacent poles on the left side. Further rotation of mode selector switch 42 to a full clockwise rotation allows operation of drip watering only and causes connections to be made across adjacent poles in the upper left quadrant and lower right quadrant.

Once timer motor 122 has moved slightly, lawn switch 188 becomes disengaged (as shown) and indexing motor 114 would stop if an alternate source of power were not available. Rest switch 244 (illustrated in FIG. 5) is a normally closed switch which only opens when indexing motor 114 is at rest. Once indexing motor 114 has started, rest switch 244 provides the alternate source of power and opens only when rotary switch 48 has completed its cycle and is in a rest position. If desired, a pump switch 246 may be located with rest switch 244 to begin operation of a remote pump to provide sufficient water pressure for all of the remote water valves activated by irrigation controller 10.

The initiation of an irrigation cycle by the tripping of lawn switch 188 does not insure that every pole on rotary switch 48 is activated. The placement of a shrub override pin 226 in shrub wheel 46 as described in conjunction with FIG. 14 opens shrub override switch 220 requiring shrub switch 208 to be independently activated by an appropriately placed pin 24 on day wheel 22 (FIG. 2) before that pole will operate. In other words, by placing a shrub override pin 226 in a particular pin holder 224 as illustrated in FIG. 14, a particular circuit is designated as a shrub circuit which will only be operated by the specific placement of a shrub pin 32 (FIG. 2) in the lowest of three positions on day wheel 22 for the desired day or days.

Drip switch 188' provides another function not found on other controllers by utilizing the combined selection of pins 28 (FIG. 2) on hour wheel 20 and pins 30 on day wheel 22 without having any connection at all to indexing means 34 operating through rotary switch 48. Drip watering requires activation of a remotely controlled valve over a long period of time measured in terms of hours instead of minutes. The functions of indexing means 34 operating through rotary switch 48 are unuseable for providing this type of watering. Hour wheel 20 and day wheel 22 alone provide appropriate measured periods of time for the desired drip watering feature.

Figure 16:
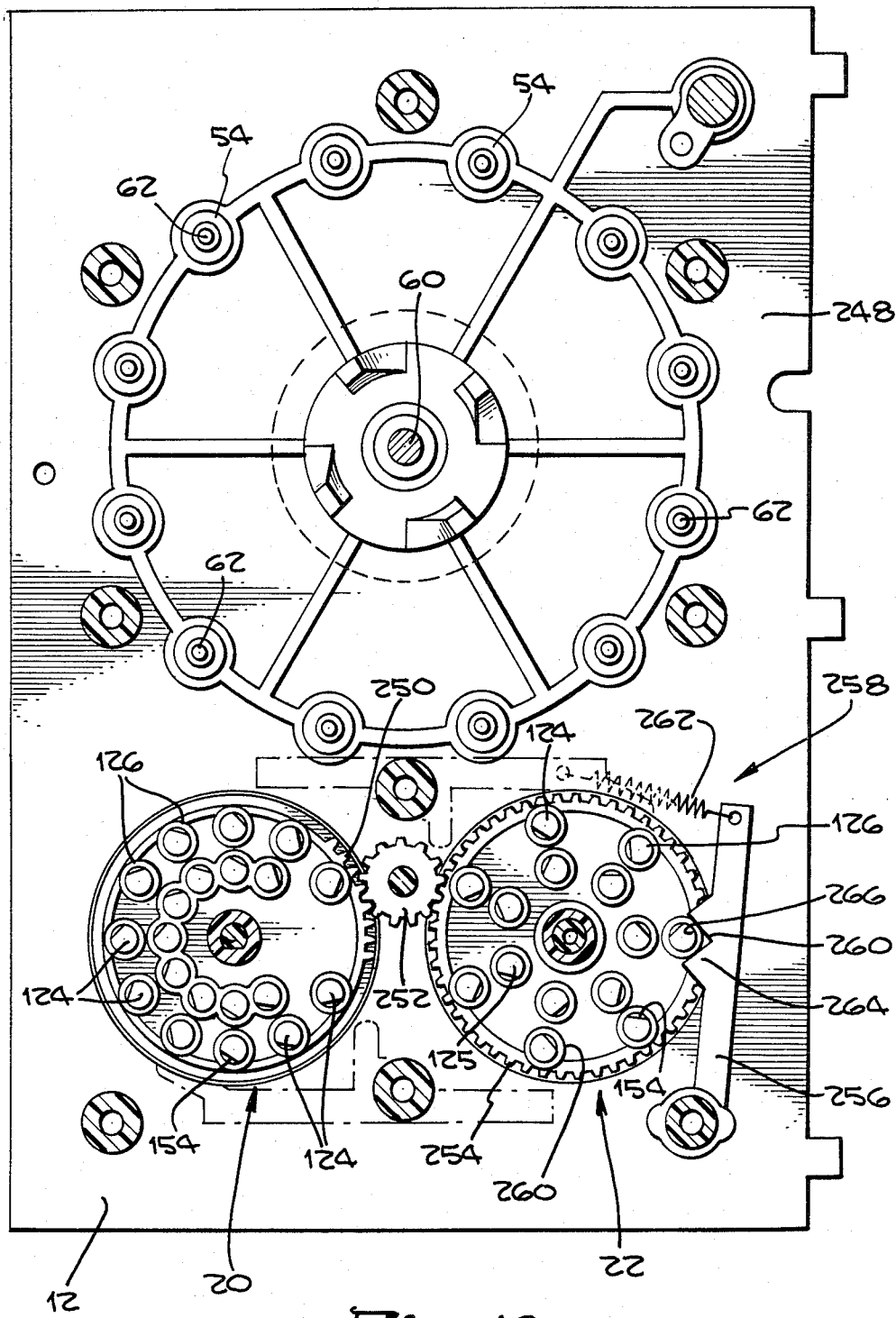
FIG. 16 is a sectional view along line XVI—XVI of FIG. 3.

FIG. 16 is a sectional view along line XVI—XVI of FIG. 3 generally showing the back of face plate 248. Hour wheel 20 is rotated continuously by timer motor 122 (FIG. 5). Ring gear segment 250 is located on the periphery of hour wheel 20 and turns idler gear 252 only when ring gear segment 250 is in contact with idler gear 252. Idler gear 252 in turn rotates day wheel 22 through second ring gear 254. Once ring gear segment 250 has passed out of contact with idler gear 252, day wheel 22 would be free to rotate except for the provision of day wheel holder means 258. Day wheel holder means 258 comprises positioner lever 256 operating in cooperation with a plurality of semicircular ridges 260 presented toward the periphery of day wheel 22 and having one semicircular ridge for each given day. The semicircular ridges are, in actuality, the outer portion of the bottoms of receptacles 126 for pins 124. Positioner lever 256 is biased against day wheel 22 by spring 262. Adjuster means 264 is a V-shaped centering notch 266 which aligns day wheel 22 to a desired operative position by advancing or returning day wheel 22 slightly depending upon where day wheel 22 is released by idler gear 252. The V-shape insures that semicircular ridge 260 centers in the bottom of notch 266. The design of day wheel holder means 258 allows substitution of day wheels having other than seven days. Day wheel 22 illustrated in FIG. 16 has seven days provided but a six day wheel could have been shown.

Figure 17:
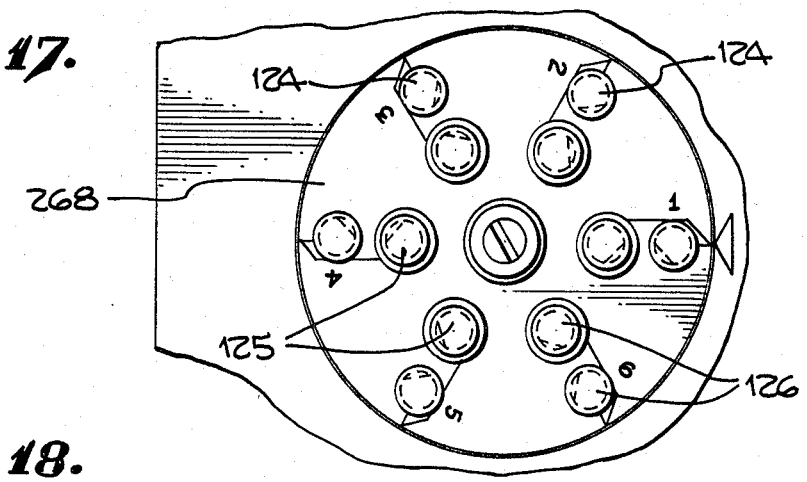
FIG. 17 is a top view of a six day wheel similar to the seven day wheel of FIG. 12.

FIG. 17 is a top view of a six day wheel 268 similar to day wheel 22 of FIG. 12. The pins 124 and 125 and receptacles 126 remain exactly the same except for the number of pins and receptacles and locations.

Figure 18:
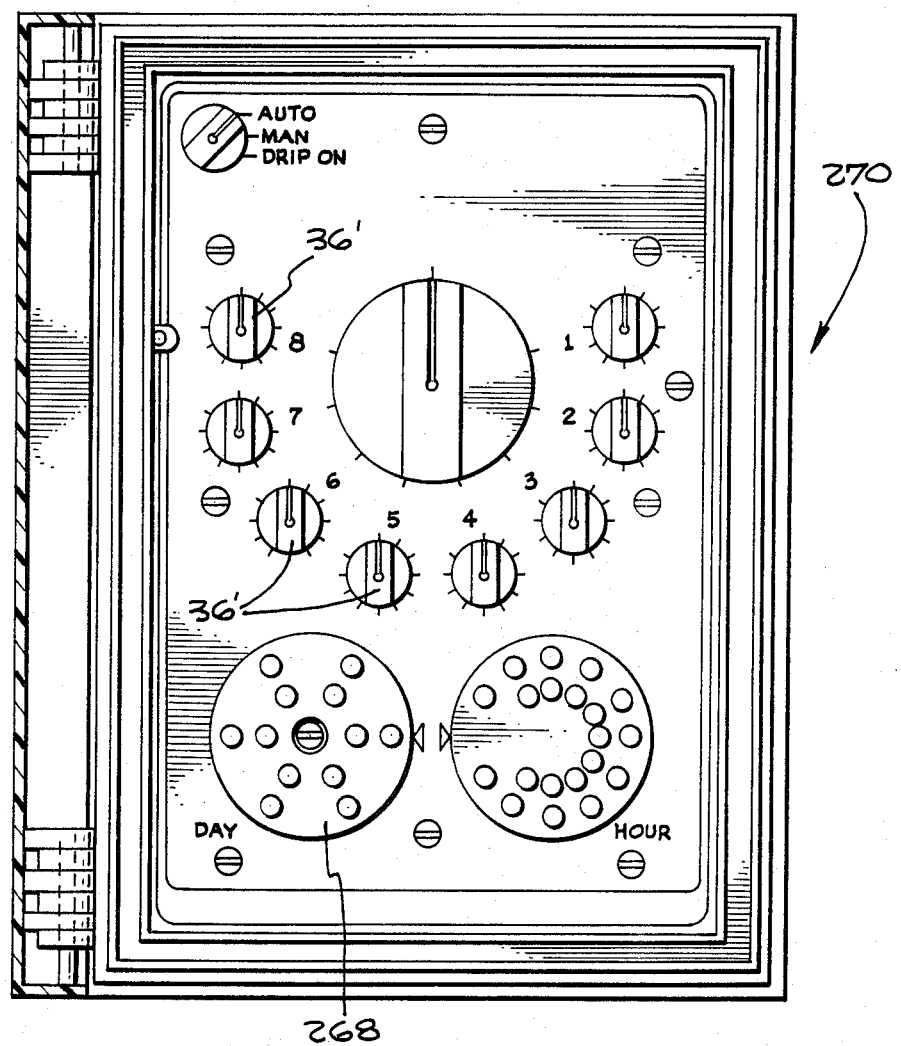
FIG. 18 is a front view similar to FIG. 2 of another embodiment of the present invention.

FIG. 18 is a front view similar to FIG. 2 of another embodiment 270 of the present invention having eight timing units 36' instead of the twelve timing units 36 shown on FIG. 2. Six day wheel 268 is incorporated in embodiment 270 although a seven day wheel such as day wheel 22 (FIG. 2) could have been illustrated.

FIG. 19 is a top view of a portion of a hydraulic embodiment, generally designated 272, of the present invention. Hydraulic wheel 274 is identical to shrub wheel 46 illustrated in FIG. 14 except for the provision of pinholders and numbers. Hydraulic embodiment 272 substitutes entirely for rotary switch 48 and all ancillary parts illustrated in FIG. 14. Rotary switch 48 in FIG. 14 controls a plurality of remotely located electrically activated valves. Hydraulic embodiment 272 eliminates entirely the electrical aspects between irrigation controller 10 and the remotely located irrigation valves. Instead, hydraulic embodiment 272 utilizes water passing through a rotary hydraulic pilot valve and tubing to communicate and control the remote hydraulically activated irrigation valves. Except for the substitution of hydraulic embodiment 272 for rotary switch 48 illustrated in FIG. 14, all other aspects of irrigation controller 10 remain the same.

FIG. 20 is a sectional view of hydraulic embodiment 272 along line XX—XX of FIG. 19. Rotary hydraulic pilot valve 276 substitutes for all of rotary switch 48 illustrated below lines XIV—XIV of FIG. 3. Hydraulic wheel 274 serves the same function and is positioned in the same location in relation to the remainder of irrigation controller 10 as shrub wheel 46 shown in FIG. 3. Pilot valve 276 has inlet port 278 for connection to the source of water under pressure which enters pilot valve 276 in the direction of arrow 280. Water entering port 278 passes into central chamber 282 and enters valve rotor 284. Valve rotor 284 is turned by shaft 286 connected to hydraulic wheel 274. Valve rotor 284 is held against valve seat 288 by spring 290. As illustrated in FIG. 20, valve rotor 284 is in alignment with seventh outlet port 307 which controls the seventh remote irrigation valve by water flow through a pipe in a direction indicated by arrow 294. Any water leaking between valve rotor 284 and valve seat 288 passes into drain chamber 296 and exits pilot valve 276 through drain port 298 in the direction indicated by arrow 300.

FIG. 21 is a bottom view of pilot valve 276 of FIG. 20. FIG. 20 is a sectional view of FIG. 21 along line XX—XX of FIG. 21. The water supply enters pilot valve 276 at inlet port 278 and passes into central chamber 282. The water is then distributed by valve rotor 284 shown in FIG. 20 to the various outlet ports 1 through 12 numbered 301 through 312. In this manner, pilot valve 276 is able to control 12 remotely located irrigation valves through a series of 12 pipes connected to the 12 outlet ports. Any excess water leaking past valve rotor 284 drains from pilot valve 276 through drain port 298.

FIG. 22 is a sectional view along the lines XXII—XXII of FIG. 20 illustrating valve seat 288 and valve rotor 284. The relationship between FIG. 20 and FIG. 22 is indicated by line XX—XX in FIG. 22. Valve rotor 284 is lined up with seventh outlet port 307.

FIG. 23 is a perspective view of valve rotor 284. Water enters rotor inlet port 314 in the direction indicated by arrow 316, passes through an internal passageway (not illustrated) and exits through rotor outlet port 318 in the direction indicated by arrow 320. Thus, rotation of valve rotor 284 causes valve rotor 284 to distribute water through rotor outlet 318 to the various outlet ports 301 through 312 illustrated in FIG. 21 to control 12 remotely located irrigation valves. Any water leaking internally around valve rotor 284 passes through one or more drain holes 320 to exit through drain port 298 illustrated in FIGS. 20 and 21.

Having now reviewed the above description and the drawings, those skilled in the art will realize that a wide variety of embodiments may be employed in producing equipment in accordance with the present invention. In many instances, such embodiments may not even resemble that depicted here and may be used for application other than that shown and described. Nevertheless, such embodiments will employ the spirit and scope of the invention as set forth in the following claims.

I claim:

1. An irrigation controller for use with a plurality of electrically or hydraulically activated valves for automatically regulating the time, location, and duration of irrigation comprising, in combination:

a rotary means for sequentially activating said valves;

an indexing means for moving said rotary means having adjustable timing unit means for determining dwell time on each valve;

an hour timer means for determining the time of day for activating said indexing means;

a day timer means for determining the day for activating said indexing means;

wherein each of said hour and day timer means further comprises a cylindrical selector pin and receptacle;

said selector pin having:

a first predetermined diameter;

an insertion end;

an adjustment end located a first predetermined length from said insertion end;

first walls defining a slot through the axis of said pin beginning a second predetermined length from said insertion end and ending a third predetermined length from said adjustment end; and at least two pin detents;

said clindrical receptacle having:

a second predetermined diameter greater than said first predetermined diameter of said pin; and a pin detent stop combining with said at least two pin detents to hold said pin at any of said at least two pin detents and making removal of said pin from said receptacle difficult and movement of said pin between said at least two pin detents easy.

2. The arrangement defined in claim 1 wherein said at least two pin detents are on the surface of said pin perpendicular to the axis of said pin, parallel to the plane of said slot, and parallel to each other, and each of said pin detents are cylindrical cuts and have sloped sides toward all other detents.

3. The arrangement defined in claim 2 wherein the surface of said pin between said at least two pin detents is flattened to decrease resistance to movement between said detents.

4. The arrangement defined in claim 2 wherein said pin detent stop is a rectangular solid on the inner surface of said cylindrical receptacle.

5. The arrangement defined in claim 4 and further comprising an insertion facilitator means on said insertion end for initially inserting and locating said pin in said receptacle to align said at least two pin detents and said pin detent stop.

6. The arrangement defined in claim 5 wherein said insertion facilitator means comprises a lip on said insertion end having:

a lip plane parallel to said slot on the same side of the axis of said pin as said at least two pin detents and having a first depth from the cylindrical surface of said pin greater than a second depth of protrusion of said rectangular solid into said cylindrical receptacle; and a slope plane from said lip plane to the cylindrical surface of said pin at the edge of the first of said at least two detents from said insertion end.

7. The arrangement defined in claim 6 wherein said cylindrical receptacle surrounds at least half of said cylindrical pin when said pin is located at any of said at least two pin detents.

8. The arrangement defined in claim 1 wherein said cylindrical receptacle surrounds at least half of said cylindrical pin when said pin is located at any of said at least two pin detents.

9. The arrangement defined in claim 4 wherein said at least two pin detents comprises three pin detents.

10. The arrangement defined in claim 1 wherein said hour timer means comprises an hour timer wheel having at least one row of a plurality of pins and receptacles having axis parallel to the axis of said hour timer wheel and spaced about said wheel to correspond to given hours of the day and said day timer means comprises a day timer wheel having at least one row of a plurality of pins and receptacles having axis parallel to the axis of said day timer wheel and spaced about said wheel to correspond to given days.

11. The arrangement defined in claim 10 wherein each of said at least one row comprises two concentric rows.

12. An irrigation controller for use with a plurality of electrically or hydraulically activated valves for automatically regulating the time, location, and duration of irrigation comprising, in combination:

a rotary means for sequentially activating said valves;

an indexing means for moving said rotary means having adjustable timing unit means for determining dwell time on each valve;

an hour timer means for determining the time of day for activating said indexing means;

a day timer means for determining the day for activating said indexing means;

wherein said day timer means further comprises at least two interchangeable day wheels having a different number of selectable days on each wheel.

13. The arrangement defined in claim 12 wherein one of said at least two interchangeable day wheels has seven selectable days and another of said at least two interchangeable wheels has six selectable days whereby said seven day wheel is utilized to designate given days of a week and said six day wheel is utilized to designate alternate days and every third day.

14. The arrangement defined in claim 12 wherein said day timer means further comprising a day wheel holder means for adjusting and holding said day wheel in a desired position after said day wheel has been advanced by said hour wheel.

15. The arrangement defined in claim 14 wherein said day wheel holder means comprises:

a plurality of semicircular ridges presented toward the periphery of said day wheel having one semicircular ridge for each given day;

a positioner lever having an adjuster means biased against said plurality of semicircular ridges; and said adjuster means having a V-shaped centering notch for aligning said at least two day wheels to a desired operative position by advancing and returning said at least two day wheels to reach said operative position as needed.

16. An irrigation controller for use with a plurality of electrically activated valves for automatically regulating the time, location, and duration of irrigation comprising, in combination:
- a rotary switch means for sequentially activating said valves;
- an indexing means for moving said rotary switch means having adjustable timing unit means for determining dwell time on each valve;
- an hour timer means for determining the time of day for activating said indexing means;
- a day timer means for determining the day for activating said indexing means;
- an override switch selectively opening as said rotary switch moves into position to activate each of said valves;
- a lawn switch means activated by the conjunction of said hour timer means determining the time of day and said day timer means determining the day;
- a shrub switch means activated by said day timer means determining the day;
- whereby one of said plurality of electrically activated valves is activated by one of two switching events:
- said rotary switch activating one of said valves and said override switch closed; and
- said rotary switch activating one of said valves, said override switch open, and said shrub switch closed.

17. The arrangement defined in claim 16 and further comprising a drip switch means activated by the conjunction of said hour timer means determining the time of day and said day timer means determining the day.

18. An irrigation controller for use with a plurality of electrically or hydraulically activated valves for automatically regulating the time, location, and duration of irrigation comprising, in combination:
- a rotary means for sequentially activating said valves;
- an indexing means for moving said rotary means having adjustable timing unit means for determining dwell time on each valve;
- an hour timer means for determining the time of day for activating said indexing means;
- a day timer means for determining the day for activating said indexing means;
- wherein said indexing means further comprises:
  - a ratchet wheel;
  - a pawl; and
  - a silencer means between said ratchet wheel and said pawl.

19. The arrangement defined in claim 18 wherein said silencer means is an elastomer between said ratchet wheel and said pawl.

20. The arrangement defined in claim 19 wherein said elastomer is an elastomeric band covering all of the teeth of said ratchet wheel.

21. The arrangement defined in claim 20 wherein said ratchet teeth are internal to the periphery of said ratchet wheel.

22. The arrangement defined in claim 21 and further comprising an elastomeric band carrier for positioning said elastomeric band between said pawl and said ratchet teeth.

23. The arrangement defined in claim 22 wherein each of said ratchet teeth is formed as a semicircular indentation in said ratchet wheel.

24. The arrangement defined in claim 23 wherein said elastomeric band has a plurality of semicircular protrusions engaging said half cylindrical indentations in said ratchet wheel to retain said elastomeric band in a fixed position in relation to said ratchet wheel.

25. The arrangement defined in claim 6 wherein:
- said cylindrical receptacle surrounds at least half of said cylindrical pin when said pin is located at any of said at least two pin detents;
- said hour timer means comprises an hour timer wheel having two rows of a plurality of pins and receptacles having axis parallel to the axis of said hour timer wheel and spaced about said hour timer wheel to correspond to given hours of the day;
- said day timer means comprises:
  - a day timer wheel having two rows of a plurality of pins and receptacles having axis parallel to the axis of said day timer wheel and spaced about said wheel to correspond to given days;
  - at least two interchangeable day wheels wherein one of said at least two interchangeable day wheels has seven selectable days and another of said at least two interchangeable day wheels has six selectable days whereby said seven day wheel is utilized to designate given days of a week and said six day wheel is utilized to designate alternate days and every third day;
  - a day wheel holder means for adjusting and holding said day wheel in a desired position after said day wheel has been advanced by said hour wheel having:
    - a plurality of semicircular ridges presented toward the periphery of said day wheel having one semicircular ridge for each given day;
    - a positioner lever having an adjuster means biased against said plurality of semicircular ridges; and
    - said adjuster means having a V-shaped centering notch for aligning said at least two day wheels to a desired operative position by advancing and returning said at least two day wheels to achieve said operative position as needed;
- said indexing means having:
  - a ratchet wheel having:
    - ratchet teeth internal to the periphery of said ratchet wheel, each of said ratchet teeth formed as a semicircular indentation in said ratchet wheel;
  - a pawl; and
  - a silencer means between said ratchet wheel and said pawl having:
    - an elastomeric band covering all of the teeth of said ratchet wheel;
    - an elastomeric band carrier for positioning said elastomeric band between said pawl and said ratchet teeth; and
    - said elastomeric band having a plurality of semicircular protrusions engaging said half cylindrical indentations in said ratchet wheel to retain said elastomeric band in a fixed position in relation to said ratchet wheel.

26. The arrangement defined in claim 25 wherein said rotary means is an electrical rotary switch and further comprising:
- an override switch selectively opening as said rotary switch moves into position to activate each of said valves;
- a lawn switch means activated by the conjunction of said hour timer means determining the time of day and said day timer means determining the day;
- a shrub switch means activated by said day timer means determining the day;
- whereby one of said plurality of electrically activated valves is activated by one of two switching events:

said rotary switch activating one of said valves and said override switch closed; and said rotary switch activating one of said valves, said override switch open, and said shrub switch closed; and a drip switch means activated by the conjunction of said hour timer means determining the time of day and said day timer means determining the day for independently and directly controlling an additional electrically activated valve.

27. The arrangement defined in claim 25 wherein said rotary means is a rotary hydraulic pilot valve.

* * * * *